United States Patent [19]

Ichihashi et al.

[11] Patent Number: 4,971,114

[45] Date of Patent: Nov. 20, 1990

[54] ELECTROMAGNETIC PROPORTIONAL PRESSURE CONTROL VALVE

[75] Inventors: Kouji Ichihashi; Jun-ichi Yasuma, both of Saitama, Japan

[73] Assignee: Diesel Kiki Co., Ltd., Tokyo, Japan

[21] Appl. No.: 437,261

[22] Filed: Nov. 16, 1989

[30] Foreign Application Priority Data

Nov. 21, 1988 [JP] Japan .................................. 63-292469
Nov. 25, 1988 [JP] Japan .................................. 63-297379

[51] Int. Cl.⁵ .......................................... F15B 13/044
[52] U.S. Cl. .............................. 137/625.65; 251/337
[58] Field of Search ...................... 137/625.65; 251/337

[56] References Cited

U.S. PATENT DOCUMENTS

| 3,880,476 | 4/1975 | Belart et al. ............. 137/625.65 X |
| 4,763,872 | 8/1988 | Ichihashi et al. . |
| 4,809,749 | 3/1989 | Ichihashi ................ 137/625.65 |
| 4,860,792 | 8/1989 | Ichihashi et al. ............ 137/596.17 |

FOREIGN PATENT DOCUMENTS

| 157575 | 8/1985 | Japan .............................. 137/625.65 |
| 98409 | 5/1987 | Japan . |
| 110085 | 5/1987 | Japan . |
| 261782 | 11/1987 | Japan . |

Primary Examiner—Gerald A. Michalsky

[57] ABSTRACT

An electromagnetic proportional pressure control valve includes a housing, and a spool slidably received in the housing. The spool has a pair of first and second pressure receiving portions which are equal to each other in effective pressure receiving area. A primary pressure in a primary port is applied to the first pressure receiving portion, and a secondary pressure in a secondary port is applied to the second pressure receiving portion. A form due to the primary pressure acts on the spool in a direction to increase the secondary pressure, and a force due to the secondary pressure acts on the spool in a direction to decrease the secondary pressure. A force of a spring and a force of an electromagnetic actuator also act on the spool in the opposite directions. A variation in the primary pressure directly appears in the secondary pressure.

16 Claims, 5 Drawing Sheets

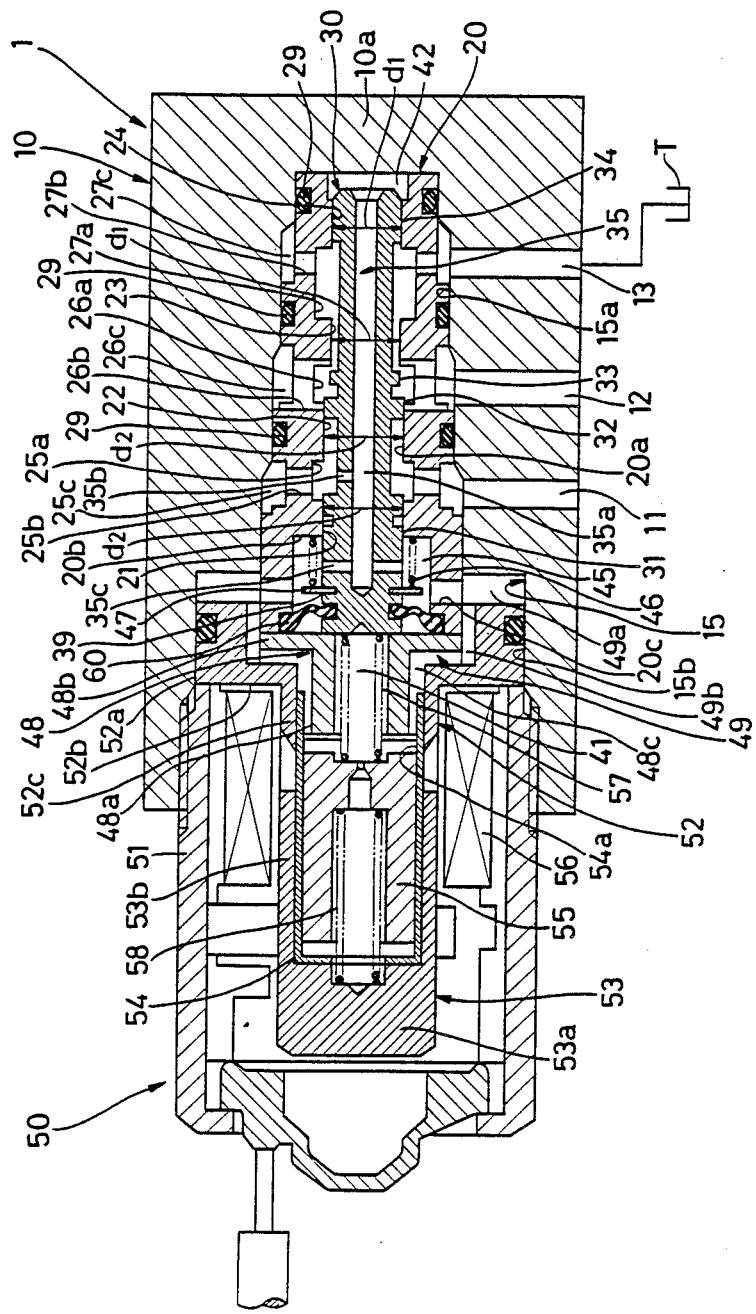

ELECTROMAGNETIC PROPORTIONAL PRESSURE CONTROL VALVE

BACKGROUND OF THE INVENTION

This invention relates to an electromagnetic proportional pressure control valve capable of producing pressure proportional to electric current supplied thereto.

A conventional electromagnetic proportional pressure control valve of the general type comprises a housing having a guide hole therein. A primary port, a secondary port and a tank port (discharge port) all of which communicate with the guide hole are arranged in this order along the length of the guide hole. A spool is received in the guide hole of the housing for movement therealong. In accordance with the movement of the spool, the communication of the secondary port with the primary port and the discharge port is controlled. An electromagnetic actuator is mounted on the housing, and when electric current is supplied to this electromagnetic actuator, an electromagnetic force proportional to the magnitude of such electric current is applied to the spool. This electromagnetic force moves the spool in such a direction as to communicate the secondary port with the primary port and to interrupt the communication between the secondary port and the discharge port, that is, in a direction to increase a secondary pressure in the secondary port.

The spool has land portions disposed respectively on the opposite sides of the secondary port, and because of the difference between the pressure receiving areas of these land portions, a force due to the pressure of the secondary port is applied to the spool. This force moves the spool in such a direction as to communicate the secondary port with the tank port and to interrupt the communication of the secondary port with the primary port, that is, in a direction to decrease the secondary pressure.

In this conventional electromagnetic proportional pressure control valve, the secondary pressure is so controlled that the electromagnetic force can be balanced with the force due to the secondary pressure. As a result, the secondary pressure is substantially proportional to the value of the electric current supplied to the electromagnetic actuator. In this conventional control valve, the effective pressure receiving area of the spool for receiving the primary pressure (pump pressure) in the primary port is zero, and the force due to the primary pressure is not applied to the spool. Therefore, in this conventional control valve, the secondary pressure is determined only by the value of the electric current supplied to the electromagnetic actuator, and even when the primary pressure varies, the secondary pressure is not influenced by such variation in the primary pressure. Although the spool is provided with a spring urging the spool in a direction opposite to the direction of the electromagnetic force, this spring is intended to restrain vibrations of the spool when the electromagnetic force is zero, and the force of this spring can be disregarded during the above control of the secondary pressure.

Other known electromagnetic proportional pressure control valves, as disclosed in Japanese Laid-Open (Kokai) Patent Application Nos. 98409/87 and 110085/87 and U.S. Pat. No. 4,763,872, utilize a pilot pressure. Such conventional control valve has a pilot chamber provided at one end of a spool, the pilot chamber communicating with a primary port via an orifice formed in the spool. The pilot chamber also communicates with a tank via a valve port formed in the housing. This valve ports closed and opened by a pilot valve. The pilot valve is subjected to an electromagnetic force of an electromagnetic actuator to be urged in its closing direction. The position of the pilot valve, that is, the degree of opening of the valve port, is so controlled that the force due to the pilot pressure in the pilot chamber can be balanced with the force of the electromagnetic actuator. With this arrangement, the pilot pressure is proportional to the value of the electric current supplied to the electromagnetic actuator. On the other hand, the pilot pressure is applied to the end of the spool, so that the spool is urged in a direction to increase the secondary pressure, that is, in a direction opposite to the direction of the force due to the secondary pressure.

In this conventional control valve, the fluid is fed from the primary port to the pilot chamber. However, the pilot pressure is lower than the primary pressure because the fluid flows through the orifice, and irrespective of the primary pressure, the pilot pressure is determined only by the value of the electric current supplied to the electromagnetic actuator. Therefore, in this conventional control valve, also, the secondary pressure is determined only by the value of the electric current supplied to the electromagnetic actuator, and even when the primary pressure varies, the secondary pressure is not influenced by such variation in the primary pressure.

In this application of the above control valve to certain uses, it is required to utilize not the secondary pressure alone but the difference between the primary pressure and the secondary pressure. Moreover, it is sometimes required to utilize such pressure difference accurately proportional to the value of the electric current. However, the conventional electromagnetic proportional pressure control valves have the disadvantage that the difference between the primary pressure and the secondary pressure is influenced by variations in the primary pressure. The reason for this is that even when the primary pressure varies, the secondary pressure is not influenced by such variation in the primary pressure.

In an electromagnetic proportional pressure control valve disclosed in Japanese Laid-Open Patent Application No. 261782/87, the force due to the secondary pressure and the force due to the pilot pressure are both applied to a spool in the same direction to decrease the secondary pressure, and the force of a spring acting against these two forces is applied to the spool in a direction to increase the secondary pressure. In this conventional control valve, the force of the spring is an important factor for the pressure control. However, even in this conventional control valve, the secondary pressure is not influenced by variations in the primary pressure and is controlled in proportion only to the value of the supply electric current, as in the above-mentioned conventional control valves.

U.S. Pat. No. 4,860,792 filed by the Applicant of the present application discloses an electromagnetic proportional pressure control valve having passages formed in both a spool and a housing.

SUMMARY OF THE INVENTION

It is therefore an object of this invention to provide an electromagnetic proportional pressure control valve in which when the primary pressure varies, the secondary pressure also varies in an amount equal to the variation in the primary pressure, so that the difference between the primary pressure and the secondary pressure will not be influenced by the variation in the primary pressure, thereby accurately controlling the pressure difference in proportion to the value of electric current supplied to the electromagnetic proportional pressure control valve.

According to the present invention, there is provided an electromagnetic proportional pressure control valve comprising:

(a) housing means having an elongated guide hole, a primary port, a secondary port and a discharge port, the three ports communicating with the guide hole and being spaced from one another along the length of the guide hole, the secondary port being disposed between the primary port and the discharge port;

(b) a spool received in the guide hole for movement along the guide hole between a first position where the secondary port is out of communication with the primary port and is in communication with the discharge port and a second position where the secondary port is in communication with the primary port and is out of communication with the discharge port, the spool including first pressure receiving means and second pressure receiving means which are equal to each other in effective pressure receiving area, a primary pressure in the primary port being applied to the first pressure receiving means whereas a secondary pressure in the secondary port is applied to the second pressure receiving means, a force due to the primary pressure being exerted in a first direction to move the spool from the first position to the second position, and a force due to the secondary pressure being exerted in a second direction to move the spool from the second position to the first position;

(c) spring means urging the spool in one of the first and second directions; and (d) an electromagnetic actuator for applying an electromagnetic force to the spool so as to move the spool in the other of the first and second directions, the electromagnetic force being proportional to the magnitude of an electric current supplied to the electromagnetic actuator.

BRIEF DESCRIPTION OF THE DRAWINGS

FIG. 1 is a cross-sectional view of an electromagnetic proportional pressure control valve provided in accordance with the present invention;

DESCRIPTION OF THE PREFERRED EMBODIMENTS OF THE INVENTION

Figure 3:
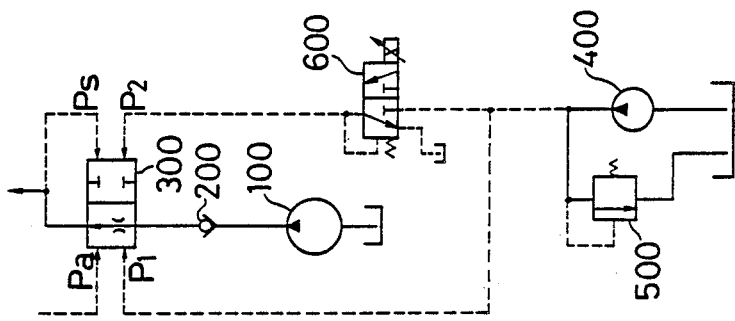
FIG. 3 is a block diagram of a portion of a hydraulic control system incorporating the control valve.

The invention will now be described with reference to the drawings.

FIG. 1 shows a first preferred embodiment of an electromagnetic proportional pressure control valve of the present invention. This control valve comprises a housing 1, and the housing 1 comprises an elongated body 10 and a guide bushing 20 mounted within the body 10.

The body 10 has an accommodation hole 15 formed therein and extending from one end thereof (the left end in FIG. 1) toward the other end in a longitudinal direction thereof. The accommodation hole 15 is stepped to provide a right portion 15a of a smaller diameter and a left portion 15b of a greater diameter. The right end of the accommodation hole 15 is closed by an end wall 10a of the body 10. A primary port 11 connected to a pump, a secondary port 12 connected to a valve, an actuator or the like, and a tank port (discharge port) 13 connected to a tank are formed through the peripheral wall of the body 10 and are arranged in this order from the left end of the body 10. Each of these ports 11, 12 and 13 extends perpendicularly to the axis of the accommodation hole 15, and communicates at one end with the accommodation hole 15 and opens at the other end to the outer peripheral surface of the body 10.

The guide bushing 20 is received in the smaller-diameter portion 15a of the accommodation hole 15. The guide bushing 20 is of a generally hollow cylindrical shape, and an axial bore 20a of the guide bushing 20 serves as a guide hole. The guide hole 20 has a right portion of a smallest diameter d1, an intermediate portion of a diameter d2 greater than the diameter d1, and a left portion of a greatest diameter. The right portion, the intermediate portion and the left portion of the guide hole 20a will be hereinafter referred to as "a small-diameter portion, an intermediate-diameter portion and a great-diameter portion", respectively. The inner peripheral surface of the guide hole 20a has a step 20b disposed between the intermediate-diameter portion and the great-diameter portion.

An annular groove 25a is formed in the inner peripheral surface of the intermediate-diameter portion of the guide hole 20a, and an annular groove 26a is formed in the inner peripheral surface of that portion of the guide hole 20a extending between the intermediate-diameter portion and the small-diameter portion. An annular groove 27a is formed in the inner peripheral surface of the small-diameter portion. The annular groove 25a communicates with the primary port 11 via through holes 25b (which are formed through the peripheral wall of the guide bushing 20) and an annular space 25c formed between the guide bushing 20 and the inner peripheral surface of the accommodation hole 15 of the body 10. Similarly, the annular groove 26a communicates with the secondary port 12 via through holes 26b and an annular space 26c, and the annular groove 27a communicates with the tank port 13 via through holes 27b and an annular space 27c. The through holes 25b, a26b and 27b constitute parts of the ports 11, 12 and 13, respectively.

The inner peripheral surface of the intermediate-diameter portion of the guide hole 20a of the guide bushing 20 has a pair of left and right guide portions 21 and 22 spaced from each other by the annular groove 25a. The inner peripheral surface of the small-diameter portion of the guide hole 20a has a pair of left and right guide portions 23 and 24 spaced from each other by the annular groove 27a.

O-rings 29 are interposed between the outer peripheral surface of the guide bushing 20 and the inner peripheral surface of the body 10, and are spaced from one another along the length of the guide bushing 20.

A spool 30 is received in the guide bushing 20 for movement along the axis thereof. The spool 30 has four land portions 31 to 34 which are formed on the outer periphery thereof, and arranged in this order from the left and are spaced from one another along the axis of the spool 30. The left land portion 31 is always held in contact with the guide portion 21 of the guide bushing 20. The right land portion 34 also is always held in contact with the guide portion 24 of the guide bushing 20. The land portion 32, disposed next to the left land portion 31, cooperates with the guide portion 22 to control the communication between the primary port 11 and the secondary port 12, as later described. The land portion 33, disposed next to the land portion 32, cooperates with the guide portion 23 to control the communication between the secondary port 12 and the tank port 13, as later described. The diameter of each of the land portions 31 and 32 is substantially equal to the diameter d2 of the guide portions 21 and 22, and the diameter of each of the land portions 33 and 34 is substantially equal to the diameter d1 of the guide portions 23 and 24.

A spring chamber 45 is formed between the outer peripheral surface of the left end portion of the spool 30 and the inner peripheral surface of the great-diameter portion of the guide hole 20a of the guide bushing 20. A return spring 45 in the form of a compression coil spring is mounted within the spring chamber 45 in surrounding relation to the left end portion of the spool 30. The return spring 46 is interposed in a compressed condition between the step 20b of the guide bushing 20 and an annular spring seat 47 fitted at its inner periphery in an annular groove 39 formed in the outer peripheral surface of the left end portion of the spool 30. The return spring 46 urged the spool 30 in a left-hand direction.

A stop member 48 is provided on the left side of the spool 30 so as to limit the movement of the spool 30 in the left-hand direction so as to determine the initial position of the spool 30. The stop member 48 has a tubular portion 48a and a peripheral flange 48b formed at the right end of the tubular portion 48a, the flange 48b being held against the the left end of the guide bushing 20. The internal bore or space of the tubular portion 48b of the stop member 48 serves as a first pilot chamber 41 for receiving a primary pressure.

On the other hand, a second pilot chamber 42 is formed between the right end face of the spool 30 and the end wall 10a of the body 10.

The spool 30 has a communication passage 35 which is constituted by an axial hole 35a extending along the axis of the spool 30 and holes 35b and 35c formed through the peripheral wall of the spool 30. The axial hole 35a is open at one end to the right end face of the spool 30, and is exposed to the second pilot chamber 42. The hole 35b communicates at one end with the axial hole 35a, and is open at the other end to the outer peripheral surface of the spool 30 intermediate the land portions 31 and 32 to communicate with the primary port 11. The hole 35c communicates at one end with the axial hole 35a, and is open at the other end to the outer peripheral surface of the spool 30 on the left side of the guide portion 21 of the guide bushing 20 to be exposed to the spring chamber 45. With this arrangement, the primary pressure from the primary port 11 is fed to the axial hole 35a via the hole 35b and is further fed to the second pilot chamber 42. The primary pressure introduced into the axial hole 35a is also fed to the first pilot chamber 41 via the holes 35c and a communication passage 49.

The communication passage 49 is constituted by the spring chamber 45, a hole 20c formed through the peripheral wall of the spool 30 at the left end portion thereof, an annular space 49a formed by part of the greater-diameter portion 15b of the accommodation hole 15 of the body 10 lying between a first stator 52 (later described) and a step or shoulder disposed between the greater-diameter portion 15b and the smaller-diameter portion 15a, an annular space 49b formed between the outer peripheral surface of the left end portion of the guide bushing 20 and the inner peripheral surface of the first stator 52, a plurality of grooves 48c each formed in the left side face of the flange 48b of the stop member 48 and the outer peripheral surface of the tubular portion 48a, and an armature chamber 54a (later described).

A diaphragm 60 of an annular shape is fixedly secured at its inner periphery to the outer periphery of the spool 30 at the left end of the spool 30, and the outer periphery of the diaphragm 60 is secured to the inner periphery of the guide bushing 20 at the left end of the guide bushing 20. The diaphragm 60 prevents the fluid from flowing from the spring chamber 45 to the armature chamber 54a via the first pilot chamber 41, and therefore the fluid is fed from the spring chamber 45 to the armature chamber 54a and the first pilot chamber 41 via the by-pass communication passage 49. With this arrangement, fine foreign matters such as dirt are prevented from being introduced into the armature chamber 54a.

An electromagnetic actuator 50 is mounted on the left end portion of the body 11. The electromagnetic actuator 50 comprises a casing 51 threaded into and fixed to the greater-diameter portion 15b of the accommodation hole 15, the first stator 52 received within the greater-diameter portion 15b, a second stator 53, a guide tube 54, an armature 55 and an exciting coil 56, the members 53, 54, 55 and 56 being received within the casing 51.

The first stator 52 has a ring-shaped base portion 52a held at its outer periphery in contact with the inner periphery of the greater-diameter portion 15b of the accommodation hole 15, a radially inwardly-directed flange 52b formed on the left end of the base portion 52a, and a tubular portion 52c extending from the inner peripheral portion of the flange 52b away from the base portion 52a coaxially therewith. The outer peripheral surface of the distal end of the tubular portion 52c is tapered. When the casing 51 is to be threaded into the greater-diameter portion 15b of the accommodation hole 15, the first stator 52 is urged by the casing 51 in a right-hand direction, so that the stop member 48 and the guide bushing 20 are held between the flange 52b of the first stator 52 and the end wall 10a of the body 10 against movement.

The second stator 53 has a base portion 53a and a tubular portion 53b extending from the right end of the base portion 53a in a right-hand direction coaxially therewith. The distal end of the tubular portion 53b is disposed in spaced opposed relation to the distal end of the tubular portion 52c of the first stator 52. The guide tube 54 made of a non-magnetic material is received in the tubular portions 52c and 53b of the two stators 52 and 53. The interior or internal space of the guide tube 54 serves as the armature chamber 54a, and the cylindrical armature 55 is received in the armature chamber 54a for sliding movement along the axis thereof.

The exciting coil 56 is mounted around the tubular portions 52c and 53b of the two stators 52 and 53. When electric current is supplied to the exciting coil 56, the exciting coil 56 produces an electromagnetic force of a magnitude proportional to the value of such supply electric current, and this electromagnetic force moves the armature 55 in a right-hand direction. The electromagnetic force exerted on the armature 55 is transmitted to the spool 30 via a compression coil spring 57 received in the first pilot chamber 41. The spring constant of the spring 57 is so high that the spring 57 is kept substantially in its original shape or length. A weak spring 58 acts between the armature 55 and the base portion 53a of the second stator 53. The spring 58 is intended to prevent the rattling of the armature 55 when the electromagnetic force is zero, and the force of the spring 58 is negligible at the time of the pressure control later described.

The stop member 48, the casing 51 of the electromagnetic actuator 50, the stators 52 and 53 and the guide tube 54 constitute part of the housing 1.

Next, the operation of the electromagnetic proportional pressure control valve of the above construction will now be described. Reference is first made to the operation when the electric current of a magnitude greater than a threshold value flows through the exciting coil 56 of the electromagnetic actuator 50. The force Fspg of the return spring 46 tends to move the spool 30 in the right-hand direction. The electromagnetic force of the elctromagnetic actuator 50 tends to move the spool 30 in the right-hand direction.

The secondary pressure P2 acts on the two land portions 32 and 33 exposed to the secondary port 12. Since the diameter d2 of the left land portion 32 is greater than the diameter d1 of the right land portion 33, the two land portions 32 is different in pressure receiving area. Therefore, a force F2 due to the secondary pressure P2 acts on the spool 30 so as to move the same in the left-hand direction, this force F2 being represented by the following formula:

$$F2 = P2 \cdot \Delta S$$

where $\Delta S$ represents the difference between the pressure receiving areas of the two land portions 32 and 33, that is, an effective pressure receiving area of the spool 30 for receiving the secondary pressure P2.

As described above, the primary pressure P1 is introduced into the two pilot chambers 41 and 42, and substantially acts on the opposite ends of the spool 30 exposed respectively to the pilot chambers 41 and 42. The pressure receiving area of the left end of the spool 30 exposed to the first pilot chamber 41 is determined by the diameter d2 of the land portion 31. The pressure receiving area of the right end of the spool 30 (including the pressure receiving area of the left end of the axial hole 35a) exposed to the second pilot chamber 42 is determined by the diameter d1 of the land portion 34. As described above, since the diameter d2 is greater than the diameter d1 (d2>d1), the pressure receiving area of the let end of the spool 30 is greater than the pressure receiving area of the right end of the spool 30. The difference between these two pressure receiving areas, that is, the effective pressure receiving area of the spool 30 for receiving the primary pressure P1 is equal to the above-mentioned effective pressure receiving area $\Delta S$ for receiving the secondary pressure P2. Therefore, a force F1 due to the primary pressure P1 acts on the spool 30 so as to move the same in the right-hand direction, this force F1 being represented by the following formula:

$$F1 = P1 \cdot \Delta S$$

The primary pressure is also applied to the land portions 31 and 32. However, since the two land portions 31 and 32 have the same diameter and hence have the same pressure receiving area, the forces resulting from the primary pressure and acting respectively on the land portions 31 and 32 in opposite directions cancel each other.

As is clear from the above discussion, the total Fo of the four forces applied to the spool 30 can be expressed by the following formula:

$$Fo = P1 \cdot \Delta S + Fsol - P2 \cdot \Delta S - Fspg \quad\quad (1)$$

where Fsol represents the electromagnetic force, and the minus sign indicates that the force acts in the left-hand direction, and the plus sign indicates hat the force acts in the right-hand directions.

The position of the spool 30 is so controlled that the four forces can be balanced, that is, the following formula can be established, with Fo becoming zero:

$$P1 \cdot \Delta S + Fsol = P2 \cdot \Delta S + Fspg \quad\quad (2)$$

More specifically, when the electric current of a magnitude greater than the threshold value is flowing through the exciting coil 56, the spool 30 is positioned in the range of a predetermined region of the stroke of movement of the spool 30, and at this region, the land portions 32 and 33 of the spool 30 are disposed out of contact with the guide portions 22 and 23, respectively, so that the left and right ends of each through hole 26b are slightly opened respectively by the land portions 32 and 33. The left ends of the through holes 26b constitute a throttle disposed between the secondary port 12 and the primary port 11. The right ends of the through holes 26b constitute a throttle disposed between the secondary port 12 and the tank port 13.

When the value of the electric current supplied to the exciting coil 56 increases, the electromagnetic force of the electromagnetic actuator 50 increases, so that the spool 30 is moved in the right-hand direction. As a result, the area of opening of the left end of each through hole 26b increases whereas the area of opening of the right end of the through hole 26b decreases. Therefore, the secondary pressure in the secondary port 12 increases to stop the spool 30 in such a position as to satisfy the above formula (2). In contrast, when the magnitude of the supply electric current to the exciting coil 56 decreases, the spool 30 is moved in the left-hand direction, thereby decreasing the secondary pressure.

In this manner, the secondary pressure is controlled in proportion to the value of the electric current supplied to the electromagnetic actuator 50.

The above formula (2) can be expressed in the following manner:

$$P2 = P1 + (Fsol - Fspg)/\Delta S \quad \quad (3)$$

As is clear from this formula (3), variations in the primary pressure P1 directly appear in the secondary pressure P2. As a result, the differential pressure (P1−P2) is accurately controlled in response only to the value of the above supply current, that is, in response only to the electromagnetic force Fsol.

Figure 2:
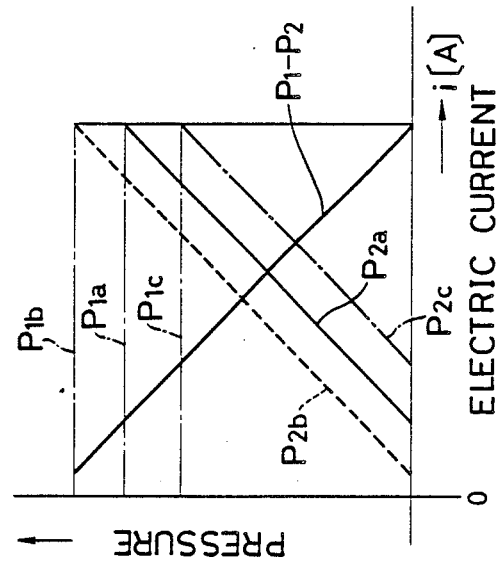
FIG. 2 is a diagrammatical illustration showing characteristics of the control valve.

This will now be explained with reference to FIG. 2. First, when the primary pressure is P1a, the secondary pressure is P2a. When the primary pressure increases to P1b, the force acting on the spool 30 in the right-hand direction increases to move the spool 30 in the right-hand direction, and therefore the secondary pressure also increases in the same amount up to P2b. When the primary pressure decreases to P1c, the secondary pressure decreases in the same amount to P2c. Therefore, the difference (P1-P2) between the primary pressure and the secondary pressure is not influenced by the variation in the primary pressure, and is controlled only in inverse proportion to the electric current supplied to the electromagnetic actuator 50, thereby achieving an accurate control of the pressure difference.

When the electric current is not supplied to the exciting coil 56 of the electromagnetic actuator 50, it is necessary that the spool 30 should be disposed in its initial position shown in FIG. 1 so as to render the secondary pressure zero. Here, the above formula (1) will now be discussed. In the formula (1), Fsol is zero, and P2·ΔS is zero, and therefore the following formula can be obtained:

$$Fo = P1 \cdot \Delta S - Fspg \quad \quad (4)$$

As is clear from this formula (4), in order to maintain the spool 30 in its initial position, the following requirement must be met:

$$Fspg \geq P1 \cdot \Delta S \quad \quad (5)$$

Incidentally, in the initial position of the spool 30, the left end of the spool 30 is held against the stop member 48. However, a plurality of notches (not shown) is formed in one of the opposed faces of the spool 30 and stopper member 48, and therefore the pressure receiving area of the spool 30 at its left end when the spool 30 is held in contact with the stop member 48 is not so different from the pressure receiving area of the spool 30 when the left end of the spool 30 is spaced apart from the stop member 48. Thus, the effective pressure receiving area for receiving the primary pressure is substantially ΔS.

When the spool 30 is in its initial position, the land portion 32 of the spool 30 is held in contact with the guide portion 22 of the guide bushing 20 over the entire periphery thereof, thereby interrupting the communication of the secondary port 12 with the primary port 11. In this condition, the land portion 33 is spaced apart from the guide portion 23 to communicate the secondary port 12 with the tank port 13. As a result, the secondary pressure is the atmospheric pressure and hence is substantially zero.

As the value of the electric current supplied to the electromagnetic actuator 50 increases, the spool 30 is moved away rom the stopper member 48, and when the electric current 32 is brought into registry with the left ends of the through holes 26.

The electromagnetic proportional pressure control valve of the above construction is used, for example, in a hydraulic control system shown in FIG. 3. This hydraulic control system is disclosed in U.S. application Ser. No. 432,858, filed Nov. 7, 1989. This hydraulic control system is designed to drive a plurality of actuators, and comprises a single main pump 100, directional control valves (not shown) corresponding respectively to the actuators, a check valve 200 disposed between each directional control valve and the main pump 100, and a pressure compensation valve 300 disposed between each directional control valve and the main pump 100. The hydraulic control system further comprises a pilot pump 400, and a relief valve 500 connected to the outlet side of the pilot pump 400 so as to keep an output pressure P1 of the pilot pump 400 at a constant level, and an electromagnetic proportional pressure control valve 600 having a primary port connected to the pilot pump 400. Therefore, the output pressure P1 of the pilot pump 400 serves as the primary pressure of the electromagnetic proportional pressure control valve shown in FIG. 1 is used as this control valve 600.

The pressure compensation valve 300 has two pilot ports which respectively receive the primary pressure P1 from the pilot pump 400 and the secondary pressure P2 of the electromagnetic proportional pressure control valve 600. The pressure compensation valve 300 also has two feed-back ports which respectively receive a pressure Ps (developing between the pressure compensation valve 300 and the directional control valve) and a pressure Pa developing between the directional control valve and the actuator. In the pressure compensation valve 300, the control is effected so that the pressure difference (ps−Pa) between the above fed-back pressures can coincide with the pressure difference (P1−P2) between the pressures inputted respectively to the two pilot ports. The electromagnetic proportional pressure control valve 600 controls the secondary pressure P2 in accordance with the electric current supplied thereto, and hence controls the pressure difference (P1−P2) in the pressure compensation valve 300. In this hydraulic control system, when the relief valve 500 fails to function properly because of over-ride or the like, the primary pressure P1 varies. However, the secondary pressure P2 from the electromagnetic proportional pressure control valve 600 also varies in the same amount in accordance with the variation in the primary pressure P1. Therefore, the pressure difference (P1−P2) in the pressure compensation valve 300 is not influenced by the variation in the primary pressure P1, and therefore is quite accurately controlled in proportion to the value of the electric current supplied to the electromagnetic proportional pressure control valve 600.

Other preferred embodiments of the invention will now be described. Those parts of these embodiments corresponding to those of the preceding embodiment are designated respectively by identical reference numerals, and will not be described further.

Figure 4:
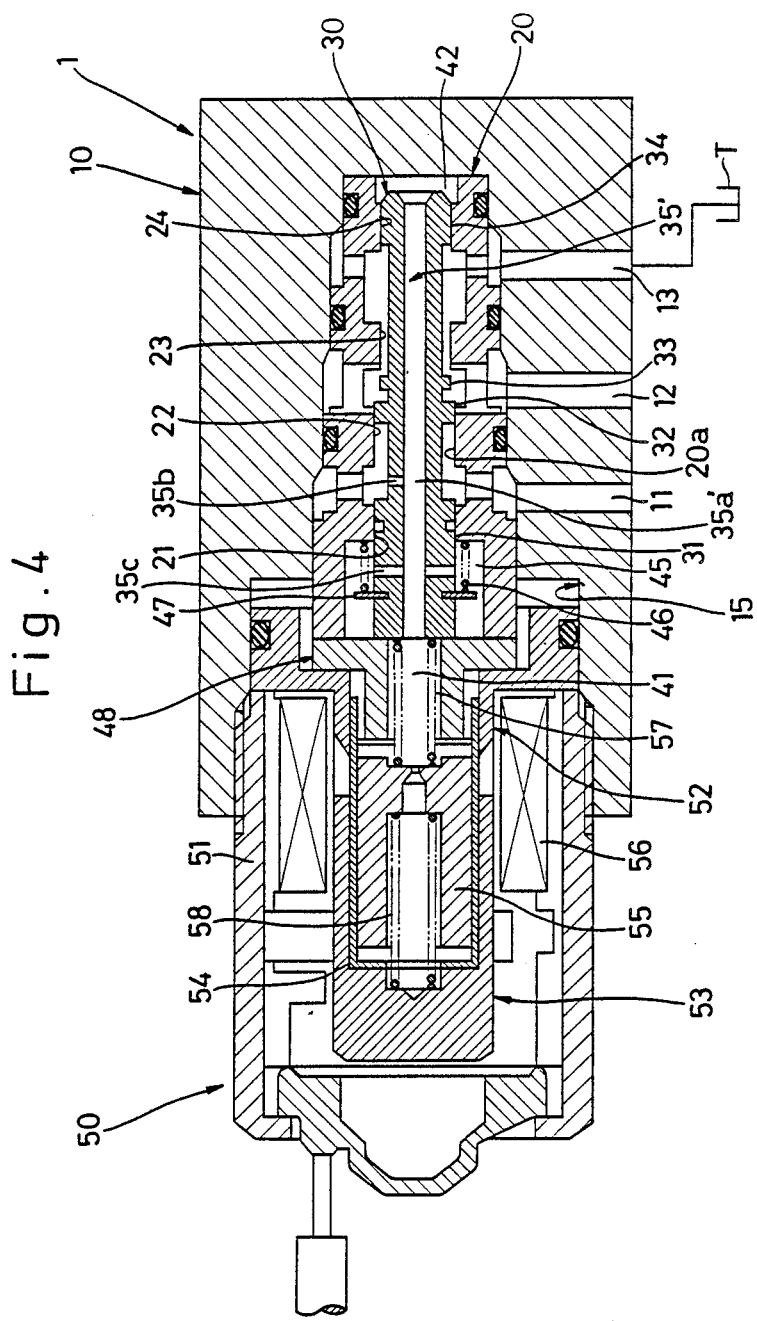
FIGS. 4 and 5 are views similar to FIG. 1, but showing modified electromagnetic proportional pressure control valves, respectively.

The modified electromagnetic proportional pressure control valve shown in FIG. 4 is identical to the control valve of FIG. 1 except for the following points. A communication passage 35' formed in a spool 30 has an axial hole 35a' extending along the axis of the spool 30, and through holes 35b and 35c formed through the peripheral wall of the spool 30. The axial hole 35a' extends axially through the spool 30, and opens at one end to the left end face of the spool 30 and is exposed to the first pilot chamber 41. The other end of the axial hole 35a' opens to the right end face of the spool and is exposed to the second pilot chamber 42. Therefore, in this embodiment, the primary port 11 is communicated with the two pilot chambers 41 and 42 only via the communication passage 35' formed in the spool 30, and therefore the communication passage 49 of the preceding embodiment of FIG. 1 is not needed.

Figure 5:
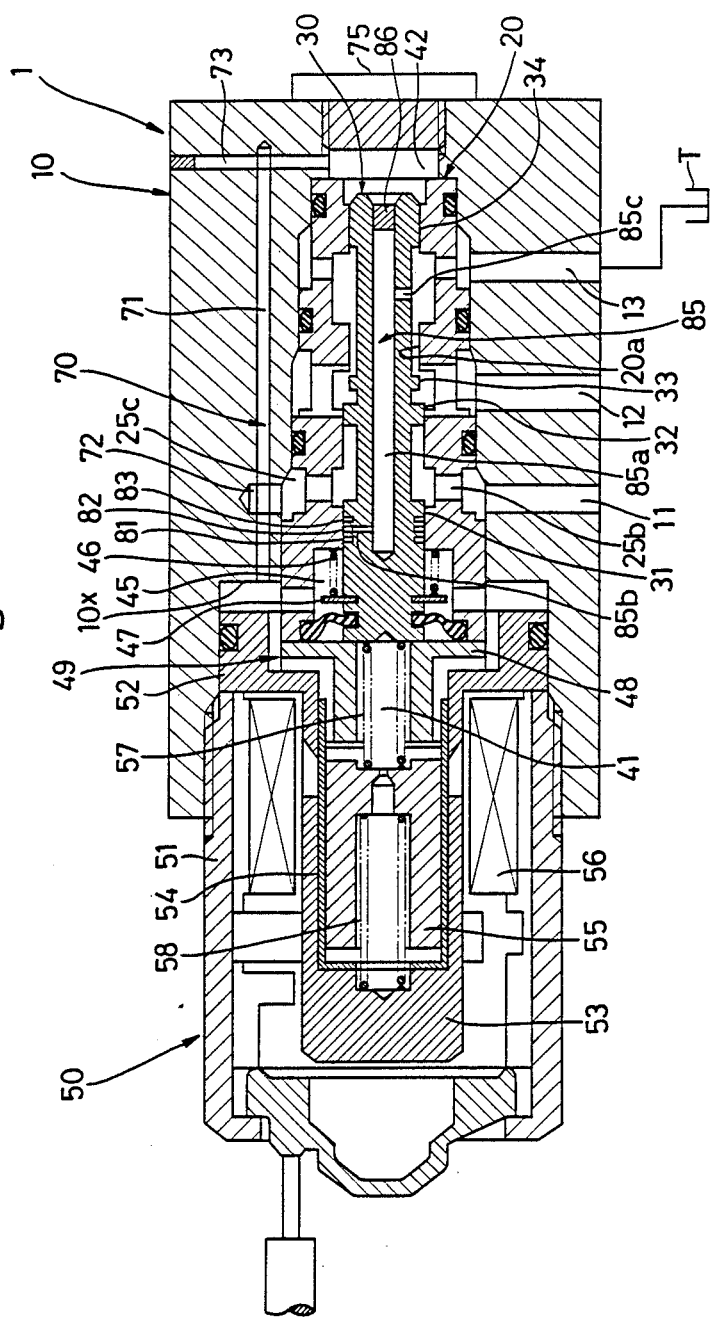

FIG. 5 shows another modified electromagnetic proportional pressure control valve which differs from the control valve of FIG. 1 in the following points. The primary port 11 communicates with the second pilot chamber 42 via a passage 70 formed in the body 10. The passage 70 includes a long hole 71 extending from a step or shoulder 10x (disposed between the smaller-diameter portion 15a and the greater-diameter portion 15b of the accommodation hole 15 of the body 10) toward the right end of the body 10 in parallel relation to the axis of the body 10, a short hole 72 connecting the annular space 25c to that portion of the long hole 71 disposed intermediate the opposite ends of the long hole 71, and a hole 73 formed in the right end portion of the body 10 and extending radially of the body 11 to intersect the long hole 71.

The left end of the long hole 71 communicates with the spring chamber 45 and the first pilot chamber 41 via the communication passage 49, and the primary pressure in the long hole 71 is also fed to the first pilot chamber 41 via the communication passage 49.

The accommodation hole 15 in the body 10 opens to the right end face of the body 10, and the right end of the accommodation hole 15 is closed by a plug 75.

The control valve of this embodiment has a tilting prevention means for preventing the spool 30 from becoming tilted relative to the axis of the guide hole 20a. More specifically, three annular grooves 81, 82 and 83 are formed in the outer periphery of the land portion 31 and are spaced from one another at equal intervals along the length of the spool 30. The intermediate annular groove 82 is slightly greater in cross-sectional area than the other annular grooves 81 and 83, and communicates wit the tank port 13 via a communication passage 85 formed in the spool 30. The communication passage 85 includes an axial hole 85a extending from the right end face of the spool 30 along the axis thereof, a hole 85b extending between the axial hole 85a and the annular groove 82, and a hole 85c radially formed through that portion of the peripheral wall of the spool 30 disposed between the lands 33 and 34, the hole 85c communicating the axial hole 85a with the tank port 13. The right end of the axial hole 85a is closed by a plug 86.

Figure 6:
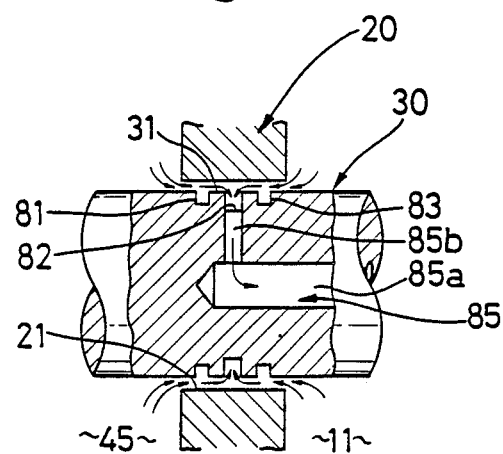
FIG. 6 is a partly-exaggerated, enlarged, cross-sectional view of a portion of the control valve of FIG. 5, showing means for preventing the tilting of a spool.

In this control valve, the relatively strong return spring 46 in the form of a compression coil spring does not urge he spring seat 47 uniformly over the entire peripheral portion of the spring seat 47. Therefore, the return spring 46 tends to tilt the spool 30 relative to the axis of the guide hole 20a. In this embodiment, however, the tilting of the spool 30 is suitably prevented. More specifically, the intermediate annular groove 82 communicates with the tank port 13 and therefore is subjected to a low pressure. Therefore, as shown in FIG. 6, the fluid under high pressure flows from the primary port 11 and the spring chamber 45 into the annular groove 82 via a narrow clearance (exaggerated in FIG. 6) between the inner periphery of the guide portion 21 and the outer periphery of the land portion 31. At this time, the high-pressure fluid is stored in the two annular grooves 81 and 83 disposed respectively on the opposite sides of the annular groove 82. The high-pressure fluid in the annular grooves 81 and 83 applies a uniform force to the outer peripheral surface of the spool 30 over the entire periphery thereof, thereby preventing the spool 30 from being tilted. Moreover, that portion of the outer peripheral surface of the spool 30 on which the high-pressure fluid acts is disposed near to that portion of the spool 30 on which the return spring 46 acts on the spool 30. Therefore, the tilting of the spool 30 can be effectively prevented. Further, since the two annular grooves 81 and 83 subjected to the high pressure are spaced from each other along the length of the spool 30, the tilting of the spool 30 can be prevented more effectively. As a result, the spool 30 is subjected to less wear and therefore has an improved durability.

Figure 7:
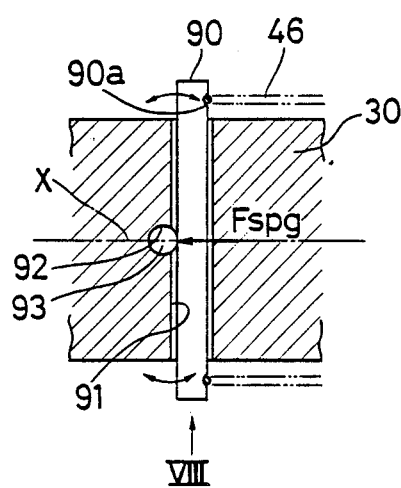
FIG. 7 is a fragmentary cross-sectional view, showing a modified means for preventing the tilting of the spool.
Figure 8:
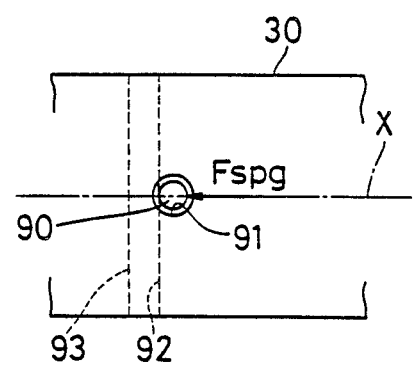
FIG. 8 is a view as seen in a direction of arrow VIII of FIG. 7.

FIGS. 7 and 8 show a modified tilting prevention means applicable to the control valves of FIGS. 1, 4 and 5. More specifically, a spring seat 90 on which one end of the return spring 46 acts is in the form of a cylindrical pin. The spool 30 has a straight through hole 91 formed therethrough and extending diametrically to pass through the axis X of the spool 30. The through hole 91 is greater in diameter than the spring seat 90. The spring seat 90 is loosely received in the through hole 91 with a play or clearance in such a manner that the opposite ends of the spring seat 90 are projected from the outer periphery surface of the spool 30. Each of the opposite ends of the spring seat 90 has a groove 90a formed in that portion of its outer peripheral surface facing the return spring 46, the groove 90a extending transversely of the spring seat 90, that is, perpendicularly to the axis of the spring seat 90. The one end of the return spring 46 is received in the two grooves 90a. The spring seat 90 is prevented from disengagement from the through hole 91, for example, by pins respectively passing through and fixed to the opposite ends of the spring seat 90.

The spool 30 also has another straight through hole 92 formed therethrough and extending diametrically to pass through the axis X of the spool 30. The through hole 92 perpendicularly intersects the through hole 91, and the axis of the through hole 92 is displaced from the axis of the through hole 91 away from the return spring 46 in the axial direction of the spool 30 in such a manner that the through hole 92 partially overlaps the through hole 91 at the axis X of the spool 30. A cylindrical support pin 93 is received in and fixed to the through hole 92. Therefore, part of the peripheral portion of the support pin 93 is projected into the through hole 91 at the axis X of the spool 30. The spring seat 90 urged by the return spring 46 in a left-hand direction (FIGS. 7 and 8) is received or supported by the outer peripheral surface of the support pin 93 in a point-contact manner. With this arrangement, the spring seat 90 can be moved swingingly (as indicated by arrows in FIG. 7) about the contact point on the outer peripheral surface of the support pin 93.

In this construction, the urging force Fspg of the return spring 46 is received by the opposite ends of the spring seat 90, and concentrates on the point of contact between the spring seat 90 and the support pin 93, that is, substantially at the axis X of the spool 30. This effectively prevents the tilting of the spool 30.

While the present invention has been specifically shown and described herein, the invention itself is not to be restricted to the exact showing of the drawings or the description thereof, and various modifications can be made without departing from the scope of the invention. For example, the urging force of the return spring can be exerted on the spool in the same direction of the force due to the primary pressure, that is, in the direction to communicate the secondary port with the primary port, in which case the electromagnetic force of the electromagnetic actuator is exerted in the same direction of the force due to the secondary pressure, that is, in the direction to interrupt the communication of the secondary port with the primary port. In this case, the secondary pressure is inversely proportional to the value of the electric current supplied to the electromagnetic actuator.

Also, the present invention is applicable to an electromagnetic proportional pressure control valve of the overlap type. In such an overlap-type control valve, when the spool is in a predetermined position or within a predetermined range of the stroke of movement of the spool, the communication of the secondary port with both the primary port and the tank port is interrupted.

What is claimed is:

1. An electromagnetic proportional pressure control valve comprising:
   (a) housing means having an elongated guide hole having an inner peripheral surface, a primary port, a secondary port and a discharge port, said three primary, secondary and discharge ports communicating with said guide hole and being spaced from one another along the length of said guide hole, said secondary port being disposed between said primary port and said discharge port;
   (b) a spool received in said guide hole for movement along said guide hole between a first position where said secondary port is out of communication with said primary port and is in communication with said discharge port and a second position where said secondary port is in communication with said primary port discharge port and is out of communication with said discharge port, said spool comprising first pressure receiving means and second pressure receiving means which are equal to each other in pressure receiving area, a primary pressure in said primary port being applied to said first pressure receiving means and a secondary pressure in said secondary port being applied to said second pressure receiving means, a force due to said primary pressure being exerted in a first direction to move said spool from said first position to said second position, and a force due to said secondary pressure being exerted in a second direction to move said spool from said second position to said first position;
   (c) spring means urging said spool in one of said first and second directions; and
   (d) an electromagnetic actuator for applying an electromagnetic force to said spool so as to move said spool in the other of said first and second directions, said electromagnetic force being proportional to the magnitude of an electric current supplied to said electromagnetic actuator;
   wherein said spool comprises a first land portion and a second land portion, said first land portion cooperating with the portion of the inner peripheral surface of said guide hole disposed between said primary port and said secondary port so as to control the communication between said primary and secondary ports, said second land portion cooperating with the portion of the inner peripheral surface of said guide hole disposed between said secondary port and said discharge port so as to control the communication between said secondary port and said discharge port, said first and second land portions constituting said second pressure receiving means, said first land portion having a diameter greater than that of said second land portion and the effective pressure receiving area of said second pressure receiving means being determined by the difference in area between pressure receiving areas of said first and second land portions.

2. An electromagnetic proportional pressure control valve according to claim 1, in which said electromagnetic force of said electromagnetic actuator moves said spool in said first direction, the force of said spring means being applied to said spool in said second direction.

3. An electromagnetic proportional pressure control valve according to claim 2, in which spring seat means is mounted on said spool, said housing means having a spring seat portion, and said spring means comprising a compression coil spring wound around said spool and acting between said spring seat means and said spring seat portion.

4. An electromagnetic proportional pressure control valve according to claim 3, in which said spring seat means comprises an annular spring seat mounted on the outer periphery of said spool.

5. An electromagnetic proportional pressure control valve according to claim 3, in which a through hole is formed diametrically through said spool and passes through the axis of said spool, said spring seat means comprising an elongated straight spring seat which is loosely passed through said through hole with its opposite ends projected from the outer peripheral surface of said spool, one end of said coil spring being received by said opposite ends of said spring seat, said spool having a support portion provided centrally of the length of said through hole and extending into said through hole, said support portion being disposed on that side of said spring seat facing away from said coil spring, said spring seat being held at its central portion against said support portion, the resilient force of said coil spring being concentrated on said support portion via said spring seat.

6. An electromagnetic proportional pressure control valve according to claim 5, in which said spool has another hole formed therein and perpendicularly intersecting said through hole at the axis of said spool, a cylindrical support pin being receiving in said another hole and fixed thereto, part of the peripheral surface of said support pin being projected into said through hole at the axis of said spool so as to serve as said support portion, and said spring seat having a cylindrical shape and held in point-contact with said support portion.

7. An electromagnetic proportional pressure control valve according to claim 1, in which said housing means includes a pair of first and second pilot chambers spaced from each other along the axis of said guide hole, said first pilot chamber being disposed at one end of said guide hole close to said primary port, said second pilot chamber being disposed at the other end of said guide hole close to said discharge port, said primary pressure being fed to said first and second pilot chambers, the opposite ends of said spool being exposed respectively to said first and second pilot chambers so as to receive said primary pressure, thus constituting said first pressure receiving means, one end of said spool exposed to said first pilot chamber being greater in pressure receiving area than the other end of said spool exposed to said second pilot chamber, and the effective pressure receiving area of said first pressure receiving means being substantially determined by the difference between the pressure receiving areas of said opposite ends of said spool.

8. An electromagnetic proportional pressure control valve according to claim 7, in which said pair of pilot chambers communicate with said primary port via communication passage means.

9. An electromagnetic proportional pressure control valve according to claim 8, in which said communication passage means includes a first passage formed in said spool, said primary pressure in said primary port being fed to said second pilot chamber via said first passage.

10. An electromagnetic proportional pressure control valve according to claim 9, in which said first passage formed in said spool has an axial hole and a first hole, said axial hole extending along the axis of said spool and opening at its one end to the other end of said spool to be exposed to said second pilot chamber, said first hole being formed through a peripheral wall of said spool and communicating at one end with said axial hole, and the other end of said first hole opening to the outer peripheral surface of said spool and communicating with said primary port.

11. An electromagnetic proportional pressure control valve according to claim 10, in which said communication passage means further includes a second passage formed in said housing means, said spool having a second hole formed through the peripheral wall thereof, said second hole communicating at one end with said axial hole and opening at the other end to the outer peripheral surface of said spool to communicate with said second passage, and said primary pressure in said primary port being fed to said first pilot chamber via said first hole, said axial hole, said second hole and said second passage.

12. An electromagnetic proportional pressure control valve according to claim 10, in which said axial hole of said spool is open at the other end to the one end of said spool to be exposed to said first pilot chamber, so that said primary pressure in said primary port is fed to said first pilot chamber via said first hole and said axial hole.

13. An electromagnetic proportional pressure control valve according to claim 8, in which said communication passage means includes a first passage and a second passage both of which are formed in said housing means, said primary port communicating with said first pilot chamber via said first passage, and said primary port communicating with said second pilot chamber via said second passage.

14. An electromagnetic proportional pressure control valve according to claim 13, in which one end portion of said guide hole disposed close to said primary port serves as a pressure introduction chamber, said primary pressure in said primary port being fed to said pressure introduction chamber via said second passage, said spool having a third land portion disposed in sliding contact with that portion of the inner peripheral surface of said guide hole disposed between said pressure introduction chamber and said primary port in such a manner that a narrow clearance is formed between said third land portion and said that portion of the inner periphery of said guide hole, said third land portion being equal in diameter to said first land portion, said third land portion having a first annular groove formed in the outer periphery thereof, said first annular groove communicating with said discharge port via a third passage formed in said spool, said third land portion also having a second annular groove and a third annular groove both of which are formed in the outer periphery thereof and disposed respectively on the opposite sides of said first annular groove, said second annular groove being spaced from said first annular groove toward said pressure introduction chamber, said third annular groove being spaced from said first annular groove toward said primary port, and a fluid of said primary pressure in said pressure introduction chamber and said primary port flowing via said narrow clearance to said first annular groove subjected to a relatively low pressure, so that the fluid under high pressure is stored in said second and third annular grooves.

15. An electromagnetic proportional pressure control valve according to claim 14, in which said third passage in said spool has an axial hole extending along the axis of said spool, a first hole and a second hole, said first and second holes being formed through the peripheral wall of said spool, said first hole communicating at one end with said axial hole and communicating at the other end with said first annular groove, and said second hole communicating at one end with said axial hole and opening at the other end to the outer periphery of said spool to communicate with said discharge port.

16. An electromagnetic proportional pressure control valve according to claim 15, in which said pressure introduction chamber serves as a chamber for accommodating said spring means therein.

* * * * *

UNITED STATES PATENT AND TRADEMARK OFFICE
CERTIFICATE OF CORRECTION

PATENT NO. : 4,971,114

DATED : November 20, 1990

INVENTOR(S) : Kouji ichihashi, et al.

It is certified that error appears in the above-identified patent and that said Letters Patent is hereby corrected as shown below:

Column 13, claim 1, line 17, delete "discharge port" from the phrase "said primary port discharge port".

Signed and Sealed this

Fifteenth Day of June, 1993

Attest:

MICHAEL K. KIRK

Attesting Officer

Acting Commissioner of Patents and Trademarks